United States Patent
Takeshita

(10) Patent No.: US 7,260,321 B2
(45) Date of Patent: Aug. 21, 2007

(54) IMAGE RECORDING APPARATUS

(75) Inventor: Yukitaka Takeshita, Asaka (JP)

(73) Assignee: Fujifilm Corporation, Tokyo (JP)

( * ) Notice: Subject to any disclaimer, the term of this patent is extended or adjusted under 35 U.S.C. 154(b) by 149 days.

(21) Appl. No.: 11/231,758

(22) Filed: Sep. 22, 2005

(65) Prior Publication Data

US 2006/0067659 A1   Mar. 30, 2006

(30) Foreign Application Priority Data

Sep. 24, 2004   (JP)   ............... 2004-277882

(51) Int. Cl.
   *G03B 17/50*   (2006.01)
(52) U.S. Cl. ......................... 396/36; 396/38
(58) Field of Classification Search ............ 396/36–38, 396/30, 39
   See application file for complete search history.

(56) References Cited

U.S. PATENT DOCUMENTS 3,829,871 A * 8/1974 Gold ........................... 396/37

4,668,062 A   5/1987 Lippert
6,305,856 B1 * 10/2001 Miyazaki ................. 400/279

FOREIGN PATENT DOCUMENTS

JP   2002-221761 A   8/2002

* cited by examiner

*Primary Examiner*—D. Rutledge
(74) *Attorney, Agent, or Firm*—Sughrue Mion, PLLC

(57) ABSTRACT

The present invention provides an image recording apparatus which has a pack compartment to be loaded with an instant film pack containing multiple instant film sheets stacked together and records images on the instant film sheets contained in the instant film pack loaded into the pack compartment while transporting the instant film sheets. The pack compartment has receiving surfaces projecting into the pack compartment and support the instant film pack loaded into the pack compartment. The receiving surfaces support the instant film pack while keeping the instant film pack tilted by making the respective amounts of projection thereof mutually different.

4 Claims, 18 Drawing Sheets

IMAGE RECORDING APPARATUS

BACKGROUND OF THE INVENTION

1. Field of the Invention

The present invention relates to an image recording apparatus which has a pack compartment to be loaded with an instant film pack containing multiple instant film sheets stacked together, and records images on the instant film sheets contained in the instant film pack loaded into the pack compartment while transporting the instant film sheets.

2. Description of the Related Art

Printers which record images on instant film sheets are conventionally known. Such printers are equipped with: a pack compartment to be loaded with an instant film pack containing multiple instant film sheets stacked together; a film door which openably covers the pack compartment; and a display unit which displays the number of remaining instant film sheets in the instant film pack loaded into the pack compartment. An image is recorded on an instant film sheet as follows: an instant film sheets contained in an instant film pack loaded into the pack compartment is raked up by a claw and transported by a pair of transport rollers while being held between them, and irradiated cyclically with lights from light-emitting elements with red (R), green (G), and blue (B) luminescent colors to write a latent image, and then a developer pod of the instant film sheet is squeezed by a pair of developing rollers to spread a developer (e.g., Japanese Patent Application Publication No. 2002-221761).

Further, U.S. Pat. No. 4,668,062 shows a structure in which projections different in the amount of projection are provided to support an instant film pack loaded in a pack compartment. This is a shape to keep a tilted pack in a straight position.

A claw raking up an instant film sheet contained in an instant film pack loaded into the pack compartment is normally so configured as to rake up a part of the rear end of the instant film sheet, the part being closer to one corner of the sheet. If the claw rakes up one corner of the instant film sheet in this way, the instant film sheet may be discharged from the instant film pack and transported by the transport rollers while it remains tilted. As a result, a latent image is recorded on the tilted instant film sheet and a tilted image is formed on the instant film sheet, lowering its quality as a product.

SUMMARY OF THE INVENTION

The present invention has been made in view of the above circumstances and provides an image recording apparatus capable of recording a not-tilted image on an instant film sheet.

An image recording apparatus according to the present invention is an apparatus which has a pack compartment to be loaded with an instant film pack containing multiple instant film sheets stacked together and records images on the instant film sheets contained in the instant film pack loaded into the pack compartment while transporting the instant film sheets, each of the instant film sheets having: an image recording section for recording an image by exposure and spread of a developer; and a developer pod disposed closer to the front of a transport direction than the image recording section, the image recording apparatus including:

a push-out member which is disposed in a position closer to the rear wall and one sidewall of the pack compartment and projects into the pack compartment, the rear wall delimiting the rear ends of the instant film sheets in the transport direction, and which pushes out one of the instant film sheets in the instant film pack loaded in the pack compartment from the instant film pack by engaging the rear end of the one of the instant film sheets, wherein the pack compartment has a supporting section which supports the instant film pack loaded in the pack compartment while keeping the instant film pack tilted by raising a part, which is closer to the other sidewall facing the one sidewall, of the rear-end face of the instant film pack.

In the image recording apparatus of the present invention, the pack compartment has a supporting section which supports the instant film pack loaded in the pack compartment while keeping the instant film pack tilted. Therefore, an instant film sheet contained in the tilted instant film pack is transported while being tilted in a manner opposite to that in which the instant film pack is tilted. Eventually, the tiling angle of the instant film pack is canceled out and the instant film sheet is kept at a proper angle while being transported, so that a proper-angle image is recorded on the instant film sheet.

Further, in the image recording apparatus according to the present invention, preferably, the supporting section has a pair of receiving surfaces at each of right and left ends of a wall of the pack compartment excluding a sheet outlet formed in the front of the transport direction, the pair of receiving surfaces projecting into the pack compartment and supporting the front-end face of the instant film pack loaded in the pack compartment, and wherein one receiving surface of the pair of the receiving surfaces, that is disposed closer to the one sidewall near which the push-out member is disposed, projects further than the other receiving surface disposed closer to the other sidewall.

The instant film pack in the pack compartment is moved to the front of the transport direction by a force that is exerted when the push-out member pushes out the instant film sheet. Therefore, by disposing the pair of receiving surfaces at each of the right and left ends of the wall of the pack compartment excluding the sheet outlet, it is possible to support the instant film pack while keeping it tilted in the pack compartment.

Furthermore, in the mage recording apparatus according to the present invention, preferably, the supporting section has a plurality of receiving surfaces which project from both sidewalls of the pack compartment running along the transport direction and support both side faces of the instant film pack loaded in the pack compartment, and wherein the plurality of receiving surfaces support the instant film pack while keeping the instant film pack tilted by making the respective amounts of projection thereof mutually different.

In this way, the instant film pack may be supported in a tilted posture by the receiving surfaces which support the side faces of the instant film pack.

As described above, according to the present invention, the instant film pack is supported while being kept tilted in a manner opposite to that the instant film sheet pushed out from the instant film pack is tilted. Accordingly, the instant film sheet pushed out from the instant film pack is kept at a proper angle while being transported and a proper-angle image is recorded thereon.

DETAILED DESCRIPTION OF THE INVENTION

An embodiment of the present invention will be described below.

Figure 1:
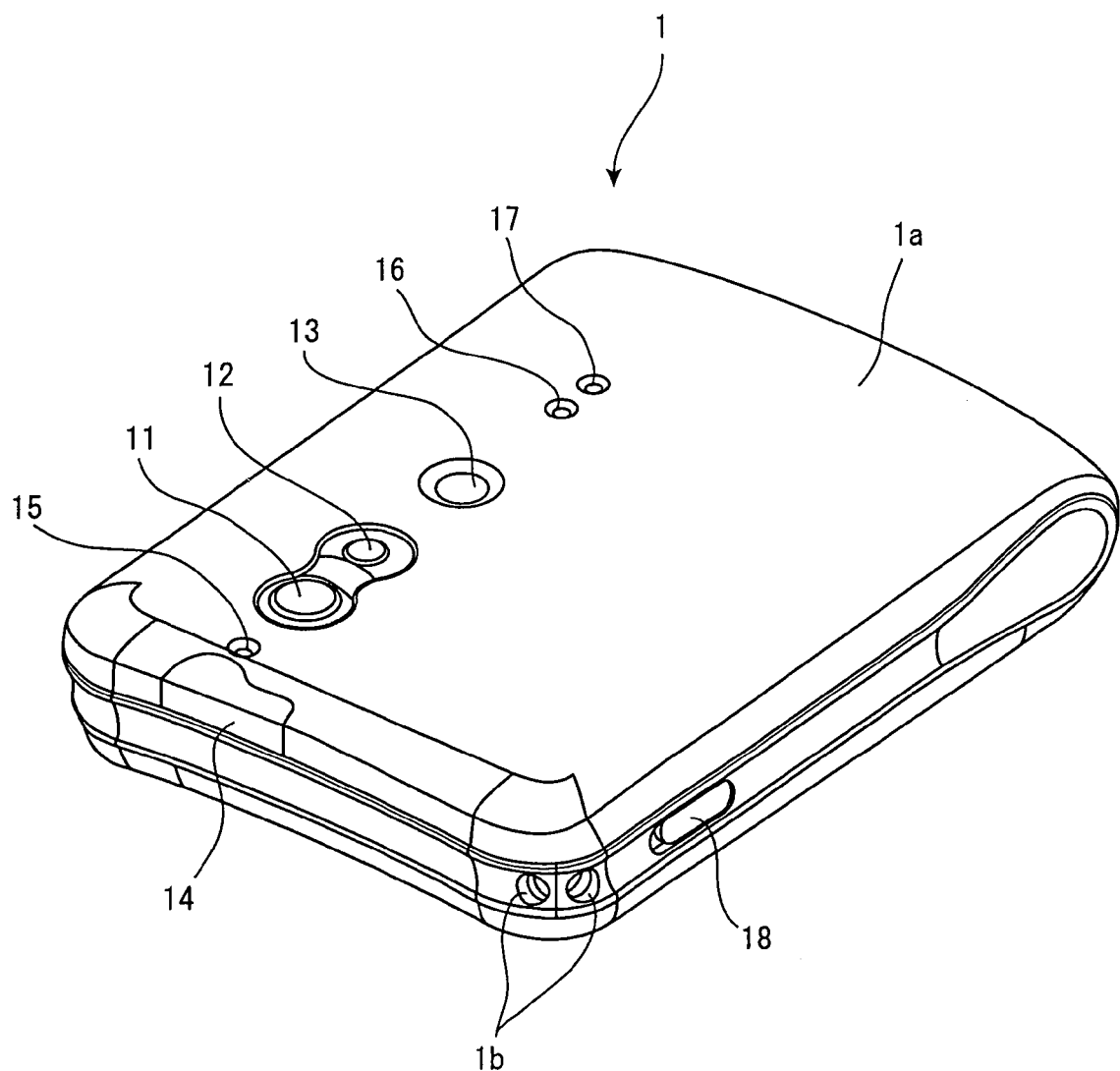
FIG. 1 is a perspective view of a printer according to an embodiment of the present invention as viewed obliquely from the front.

FIG. 1 is a perspective view of a printer according to an embodiment of the present invention as viewed obliquely from the front.

The printer 1 is to be used in combination with a cell phone or the like and has a media pack compartment loaded with an instant film pack containing a stack of instant film sheets (ten sheets in this case) on which a latent image is formed by exposure and then visualized by a developer during delivery. An instant film sheet is exposed according to image data and the developer is applied to it while the instant film sheet is being sent out.

Some cell phones are capable of infrared communication compliant with IrDA (Infrared Data Association). They can send their own information to other information devices using infrared communication. For example, a camera-equipped cell phone can send image data to the printer 1. Upon receiving image data of images taken by a camera-equipped cell phone or image data attached to mail sent to the cell phone through infrared communication, the printer 1 records images on instant film sheets based on the image data. Furthermore, images based on the received image data can be recorded again on other film sheets by simply pressing a repeat switch (described later) without the trouble of re-transmitting the image data from the cell phone.

As shown in FIG. 1, the printer 1 is a portable printer with a thin, light-weight, and small structure. It contains two 3-volt primary batteries. An instant film pack is loaded in a housing 1a of the printer 1 and an image is recorded on each of the ten instant film sheets contained in the instant film pack.

Operation buttons are provided on the top face of the housing 1a of the printer 1: a power switch (hereinafter referred to as the power SW) 11 used to turn on and off the printer 1 and a repeat switch (hereinafter referred to as the repeat SW) 12 used to re-record images based on transmitted image data. Also, a counter 13 which indicates the number of remaining instant film sheets is provided on the top face of the housing 1a. The counter 13 is a mechanical one which displays a numeric value of "10" when a new instant film pack is loaded, indicating that the number of remaining instant film sheets is 10. Subsequently, the number is decremented by one each time an image is recorded on an instant film sheet until an image is recorded on the tenth instant film sheet, and a numeric value of "0" is displayed indicating that the number of remaining instant film sheets is 0.

An end of the printer 1 is equipped with a receiver/transmitter section 14 which receives image data transmitted through the infrared communication and sends a signal notifying the partner about the reception.

Furthermore, the housing 1a of the printer 1 is equipped with a power LED 15 which glows when the printer 1 is turned on and blinks during infrared communication, a communications error LED 16 which glows in case of error in infrared communication, and a low-battery indicator LED 17 which glows when the built-in batteries become low, prompting the user to replace the batteries.

Also, a film door opening switch 18 is provided on a flank of the printer 1 to open a film door (described later) disposed on the underside of the printer 1 while a strap mount 1b is provided at a corner.

Figure 2:
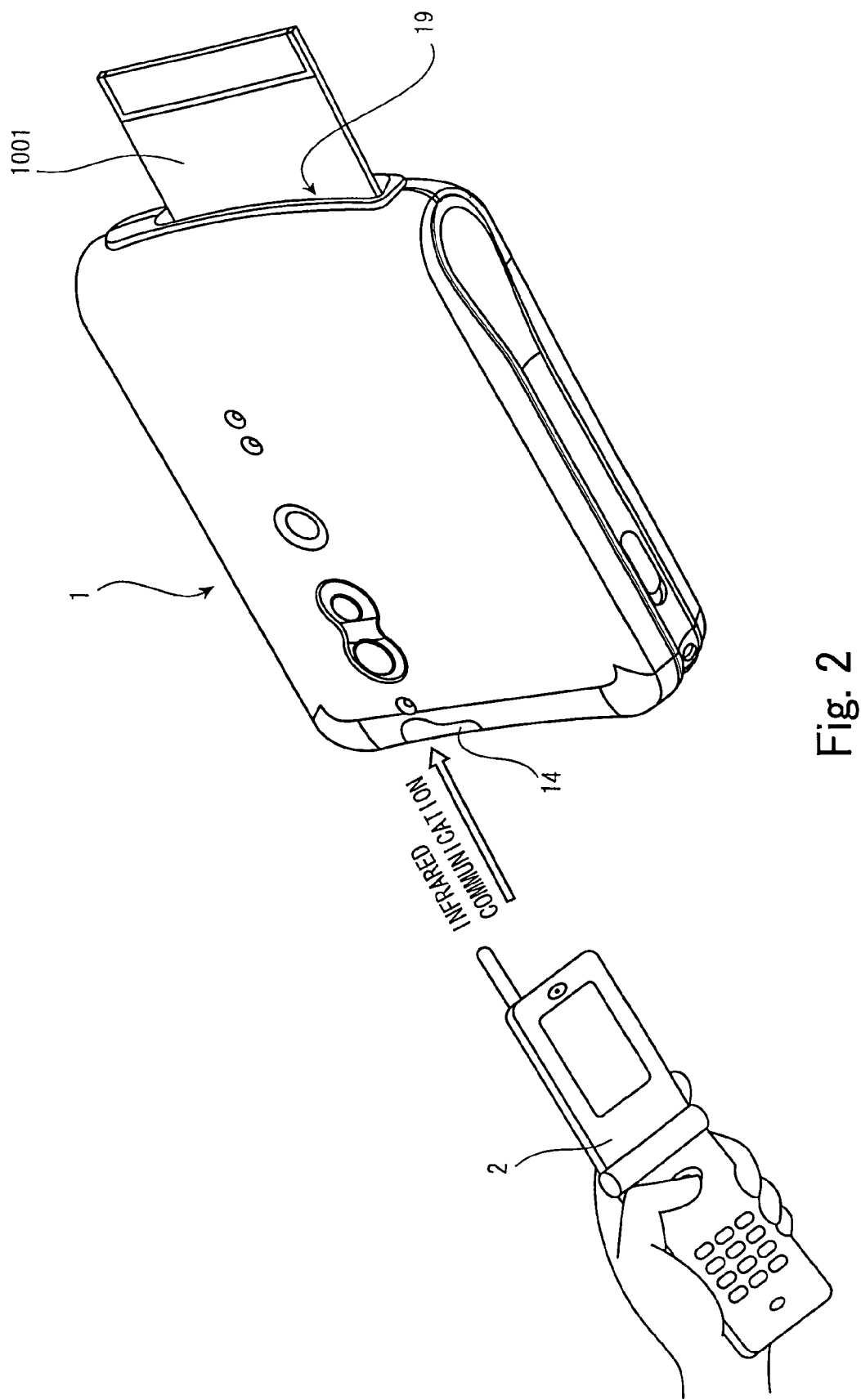
FIG. 2 is a diagram showing how the printer shown in FIG. 1 ejects an instant film sheet on which an image is recorded based on image data received from a camera-equipped cell phone.

FIG. 2 is a diagram showing how the printer shown in FIG. 1 ejects an instant film sheet on which an image is recorded based on image data received from a camera-equipped cell phone.

With an infrared communications section of a camera-equipped cell phone 2 directed at the receiver/transmitter section 14, the user operates the camera-equipped cell phone 2 to send image data of an image taken by the camera-equipped cell phone 2 to the printer 1 through infrared communication. The printer 1 receives the image data transmitted through infrared communication, records a latent image based on the received image data on an instant film sheet 1001 by exposure, develops the instant film sheet 1001, and ejects the instant film sheet 1001 gradually through an output port 19 of the printer 1. Subsequently, if the repeat SW 12 is pressed, the same image is re-recorded on another instant film sheet.

Figure 3:
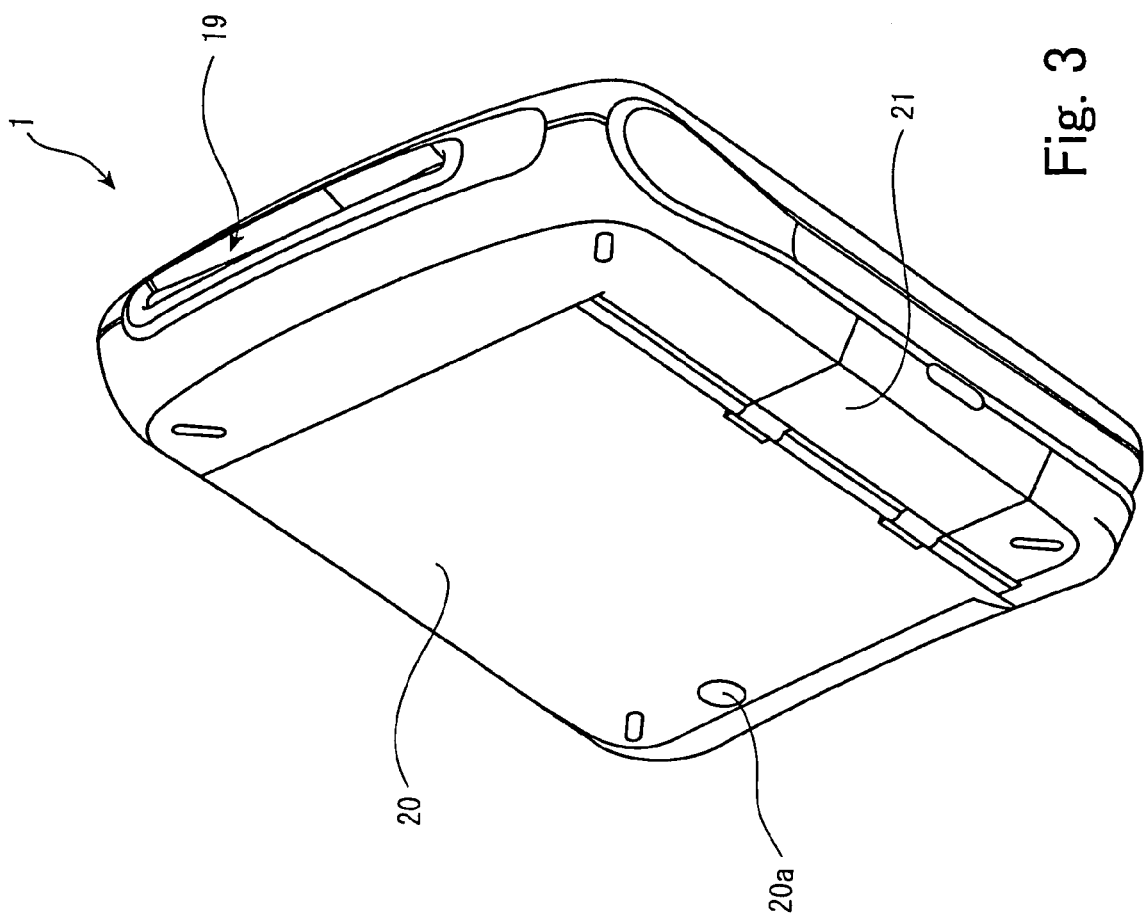
FIG. 3 is a perspective view of the underside of the printer in FIG. 1 as viewed obliquely from above.

FIG. 3 is a perspective view of the underside of the printer in FIG. 1 as viewed obliquely from above.

On the underside of the printer 1, there is a film door 20 which is opened by means of the film door opening switch 18 shown in FIG. 1. An instant film pack is loaded in the media compartment through the opened film door 20. Also, a pack confirmation window 20a is provided on the film door 20 to check whether an instant film pack has been loaded. Besides, a battery lid 21 is provided next to the film door 20. It is opened to mount batteries which supply power to the printer 1.

Figure 4:
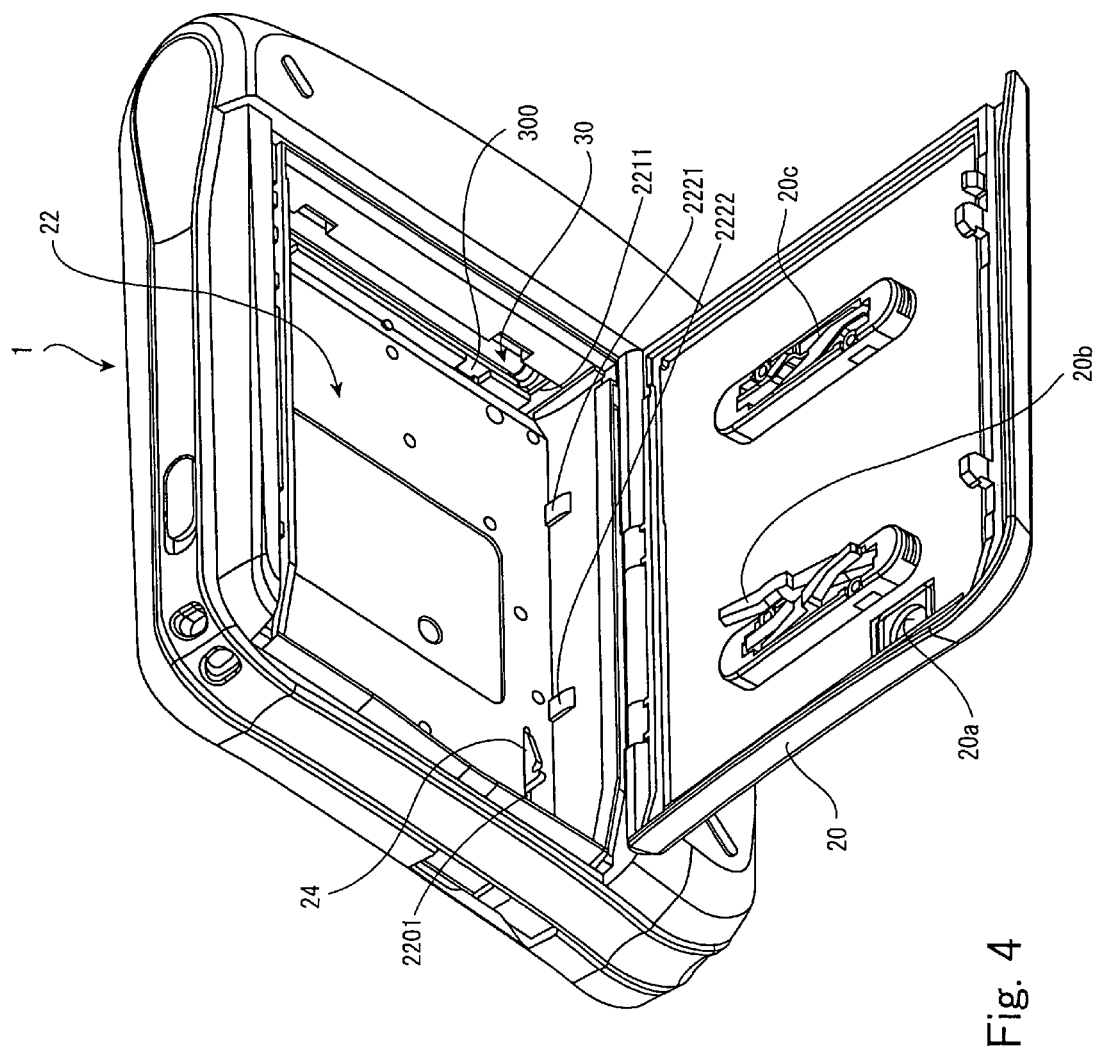
FIG. 4 is a perspective view of the printer in FIG. 3 with its film door open.

FIG. 4 is a perspective view of the printer in FIG. 3 with its film door open.

In addition to the pack confirmation window 20a described above, spring members 20b and 20c are provided on the inner side of the film door 20 to press the instant film sheets stacked in the instant film pack to the top face of the printer 1.

The printer 1 is equipped with a pack compartment 22 to be loaded with an instant film pack. As shown in FIG. 4, the pack compartment 22 has: a receiving surface 2211 for supporting the front-end face, in the transport direction of instant film sheets, of the instant film pack loaded in the pack compartment 22; and receiving surfaces 2221 and 2222 for supporting the side faces of the instant film sheets. Although not shown in FIG. 4, similar receiving surfaces are also provided opposite to these receiving surfaces. Details of these receiving surfaces will be described later.

Outside the pack compartment 22, in a right part of FIG. 4, there is disposed an image write section 300 which writes an image onto an instant film sheet being transported and a media transport/developer spreading section 30. In the pack compartment 22, in a lower part of FIG. 4, there are formed a claw 24 and a claw motion slit 2201. The claw 24 projects towards the inside of the pack compartment 22 through the claw motion slit 2201 and sends out instant film sheets to the image write section 300 and media transport/developer spreading section 30. With this configuration, the uppermost one of the instant film sheets in the instant film pack is raked up by the claw 24 projecting towards the inside the pack compartment 22 through the claw motion slit 2201 and transported by the media transport/developer spreading section 30, and in the meantime an image is recorded on it by the image write section 300 and developed.

Figure 5:
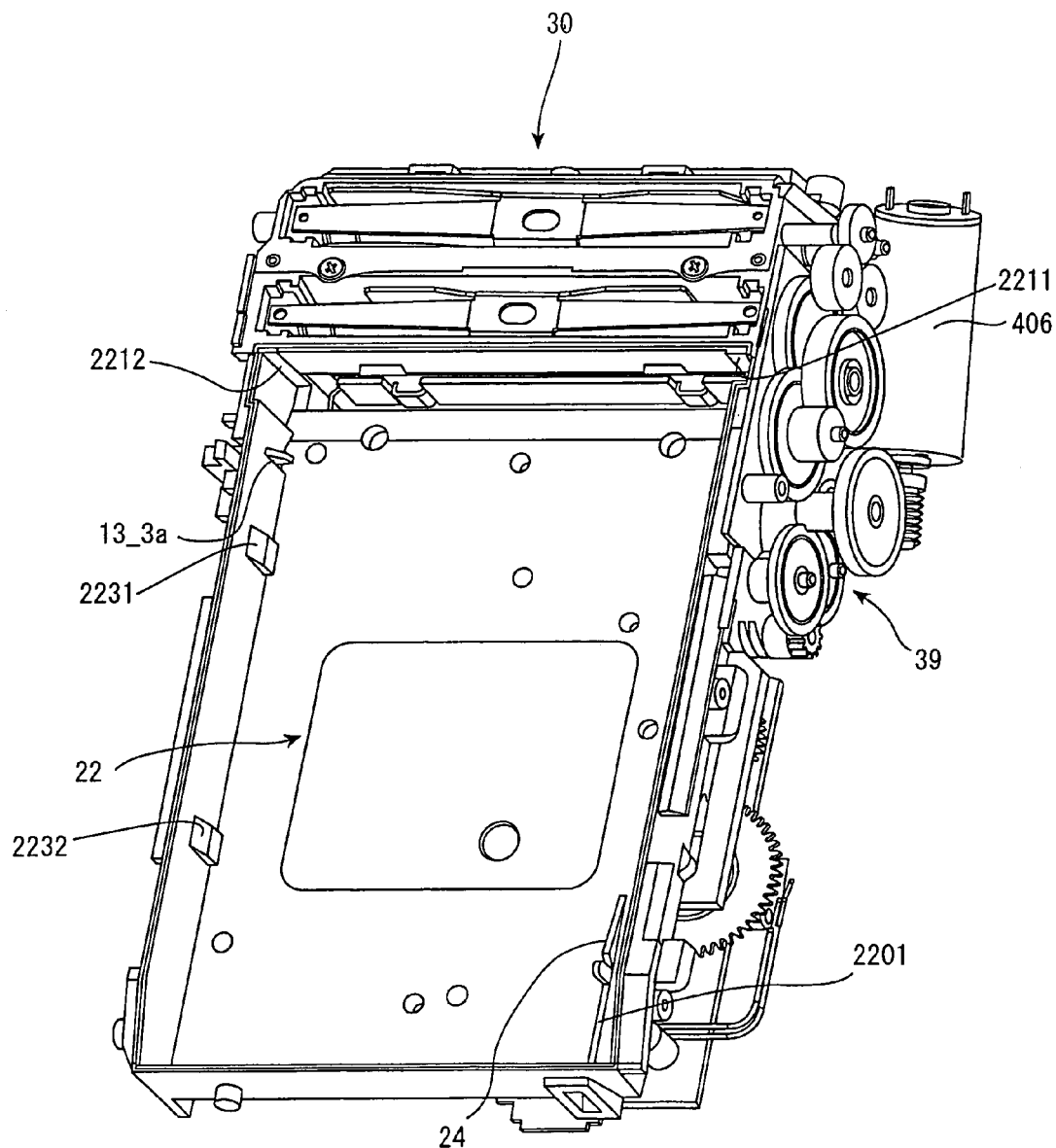
FIG. 5 is a perspective view of the printer in FIG. 4 with its housing removed.

FIG. 5 is a perspective view of the printer in FIG. 4 with its housing removed.

FIG. 5 shows a DC motor 406 as well as the media transport/developer spreading section 30 equipped with a gear train 39 which transmits the rotational drive force of the DC motor 406 to transport rollers and developing rollers described later. FIG. 5 also shows the claw 24 projecting towards the inside the pack compartment 22 through the claw motion slit 2201 as well as a rib 13_3a of a counter lever (described later) pressed when an, instant film pack is loaded.

Besides the receiving surfaces 2211, 2221 and 2222 shown in FIG. 4, FIG. 5 also shows another receiving surface 2212 for supporting the front-end face of an instant film pack and receiving surfaces 2231 and 2232 for supporting the side face of the instant film pack. They will be described later in detail.

Figure 6:
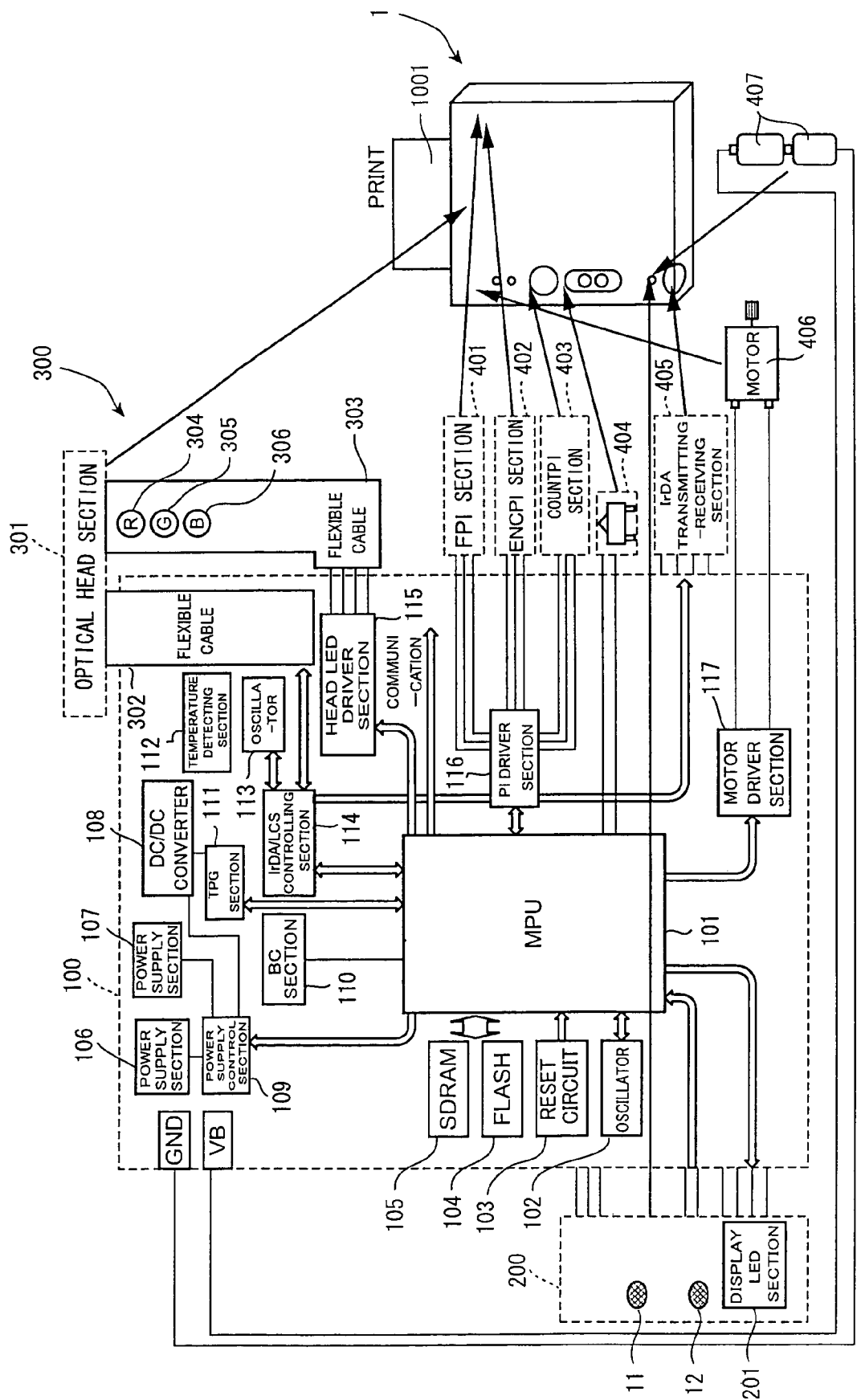
FIG. 6 is a block diagram showing a control system in the printer.

FIG. 6 is a block diagram showing a control system in the printer.

In the right end part of FIG. 6, the printer 1 shown in FIG. 1 is schematically illustrated. Except for this part, the entire area of FIG. 6 shows a configuration of the control system of the printer 1. Incidentally, the arrows in FIG. 6 indicate components of the control system of the printer 1 and their relative locations.

The printer 1 has a main board 100, a sub-board 200, the image write section 300, an FPI section 401, an ENCPI section 402, a COUNTPI section 403, a cam switch 404, an IrDA receiver/transmitter section 405 installed in the receiver/transmitter section 14 described earlier, and the DC motor 406 described above.

The sub-board 200 contains the power SW 11 and the repeat SW 12 described above as well as an indicator LED section 201. The indicator LED section 201 includes the power LED 15, communications error LED 16, and low-battery indicator LED 17 described above as well as a counter backlight LED (not shown) mounted on the back-side of the counter 13.

The image write section 300 includes an optical head section 301 equipped with an optical guide, liquid crystal shutter (LCS), etc.; flexible cables 302 and 303 which connect the optical head section 301 with the main board 100; and red (R), green (G), and blue (B) light-emitting elements (LED) 304, 305, and 306 mounted on the flexible cable 303. The image write section 300 writes a latent image on an instant film sheet being transported, by irradiating it with three color lights from the LEDs 304, 305, and 306 cyclically in synchronization with write command pulses based on image data received by the receiver/transmitter section 14. The printer 1 contains two 3-volt primary batteries 407.

The main board 100 will be described below. A 6-volt power supply voltage VB is applied to the main board 100 from the primary batteries 407 connected in series. The main board 100 is equipped with an MPU (micro processor unit) 101, an oscillator 102, a reset circuit 103, a flash memory (FLASH) 104, and a SDRAM 105.

The MPU 101 totally controls the operation of the printer 1.

The oscillator 102 generates an oscillatory signal of a predetermined frequency and supplies it as an operation clock signal to the MPU 101.

The reset circuit 103 outputs a reset signal to initialize the MPU 101.

The flash memory 104 is a non-volatile memory. It stores adjustment values and the like for adjustment of individual differences which vary with the mechanism and the like unique to the printer 1.

The SDRAM 105 is a volatile memory. It stores image data and the like received from the camera-equipped cell phone 2.

The main board 100 is equipped with a power supply section 106, a power supply section 107, and a DC/DC converter 108 which receive the 6-volt power supply voltage VB and output a 2.5-V voltage, 3.3-V voltage, and 15-V voltage, respectively. It is also equipped with a power supply control section 109 which controls the power supply sections 106 and 107 and the DC/DC converter 108 on instructions from the MPU 101. The 2.5-V voltage is supplied to the MPU 101 and the 3.3-V voltage is supplied to peripheral circuits other than the MPU 101. Also, the 15-V voltage is used to drive a LCD.

To prolong the life of the primary batteries 407, the MPU 101 of the printer 1 has a standby mode, which is a power saving mode. Even if the power SW 11 is pressed, the MPU 101 enters the standby mode after initialization is completed. In this state, if infrared communication is conducted from outside, the MPU 101 switches from standby mode to normal operation mode, records an image on an instant film sheet, and switches from normal operation mode to standby mode quickly. Also, when the repeat SW 12 is pressed, the MPU 101 records an image on an instant film sheet and then enters standby mode. The MPU 101 controls the power supply sections 106 and 107 and the DC/DC converter 108 via the power supply control section 109 so that power is supplied to various components only when necessary. This makes it possible to use the printer 1 on the built-in primary batteries 407 for a prolonged period of time.

Furthermore, the main board 100 is equipped with a BC section 110, a TPG section 111, a temperature detecting section 112, an oscillator 113, an IrDA/LCS control section 114, and a head LED drive section 115.

The BC section 110 checks whether the power supply voltage VB of the built-in primary batteries 407 is lower than a predetermined value. If it is found, based on the results of the check, that the power supply voltage VB of the built-in primary batteries 407 is lower than the predetermined value, the MPU 101 illuminates the low-battery indicator LED 17, prompting the user to replace the batteries.

The TPG section 111 turns on and off the 15-V voltage outputted from the DC/DC converter 108.

The temperature detecting section 112 detects temperature of the image write section 300. The MPU 101 controls the shutter speeds and the like of shutter sections of the liquid crystal shutter in the optical head section 301 based on a detection signal from the temperature detecting section 112.

The oscillator 113 generates an oscillatory signal of a predetermined frequency and supplies it to the IrDA/LCS control section 114.

The IrDA/LCS control section 114 controls the IrDA receiver/transmitter section 405 and the optical head section 301 based on the oscillatory signal from the oscillator 113. The IrDA receiver/transmitter section 405 is equipped with a photo-transmitter and photo-receiver used for infrared communication, and the IrDA/LCS control section 114 sends data produced by the photo-receiver as a result of photoelectric conversion to the MPU 101 and sends data from the MPU 101 via the photo-transmitter, notifying external devices to that effect. Also, the IrDA/LCS control section 114 controls the liquid crystal shutter of the optical head section 301 via the flexible cable 302 based on instructions from the MPU 101.

The head LED drive section 115 passes current through the LEDs 304, 305, and 306 via the flexible cable 303 based on instructions from the MPU 101, and thereby drives the LEDs 304, 305, and 306.

While feeding an instant film sheet in a predetermined sub-scanning direction (the feed direction of the instant film sheet) using the DC motor 406, the printer 1 according to this embodiment writes to the instant film sheet using three colors of RGB cyclically in the sub-scanning direction, writes to all pixels, arranged in the main scanning direction using the same color simultaneously in the main scanning direction orthogonal to the sub-scanning direction, and thereby records an image on the instant film sheet.

The optical head section 301 of the image write section 300 is supplied with a control signal from the IrDA/LCS control section 114 via the flexible cable 302 according to image data, and thereby a color image is recorded. The control signal controls the shutter speeds of the shutter sections of the liquid crystal shutter in the optical head section 301. The shutter speeds of the shutter sections are controlled according to the image data. Lights corresponding to the RGB colors of the LEDs 304, 305, and 306 mounted on the flexible cable 303 are directed at the instant film sheet, recording a latent image consisting of a large number of light spots (dots) on the instant film sheet along its width. The width direction along which shutter sections are arranged one-dimensionally corresponds to the main scanning direction. Thus, as shutter sections are scanned electronically in the main scanning direction, one line of light spots (all pixels) are recorded on the instant film sheet. That is, through electronic scanning by the optical head section 301, light spots consisting of a large number of dots are recorded in the main scanning direction on the instant film sheet. As described above, according to this embodiment, the instant film sheet is fed in the sub-scanning direction by the DC motor 406. Thus, light spots for a large number of dots are recorded sequentially in the sub-scanning direction as well by the image write section 300.

Furthermore, the main board 100 is equipped with a PI drive section 116, which drives the FPI section 401, ENCPI section 402, and COUNTPI section 403. Now, description will be given of the FPI section 401, ENCPI section 402, and COUNTPI section 403.

The FPI section 401 is a photointerrupter which detects the presence or absence of an instant film sheet.

The ENCPI section 402 is a photointerrupter which outputs an encoder signal consisting of pulse trains synchronized with the rotation of the DC motor 406.

The COUNTPI section 403 is a photointerrupter which detects the initial position of the counter 13.

Also, the main board 100 is connected with a cam switch 404, which is used to monitor the initial position of a transport mechanism of the printer 1.

Furthermore, the main board 100 is equipped with a motor drive section 117. The motor drive section 117 controls the rotational speed of the DC motor 406 on instructions from the MPU 101 so that the pulse train of the encoder signal outputted from the ENCPI section 402 occurs at predetermined time intervals.

Figure 7:
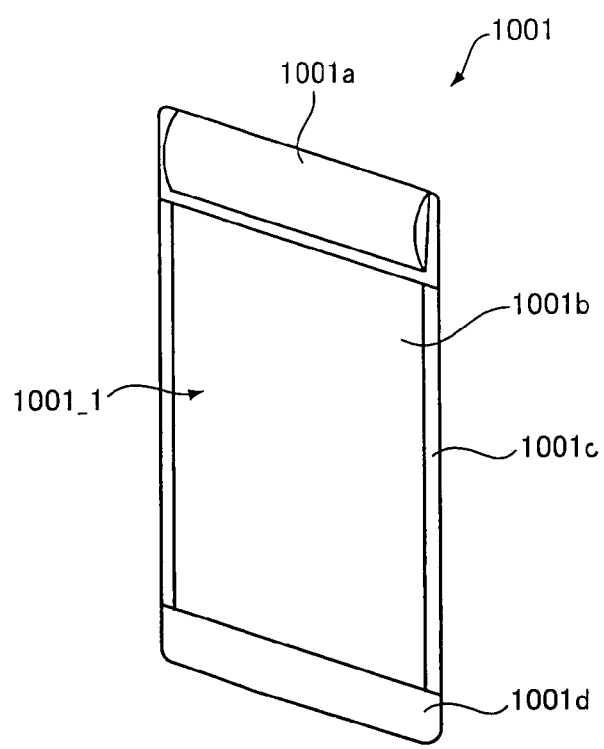
FIG. 7 is a perspective view showing an exposure surface of an instant film sheet.
Figure 8:
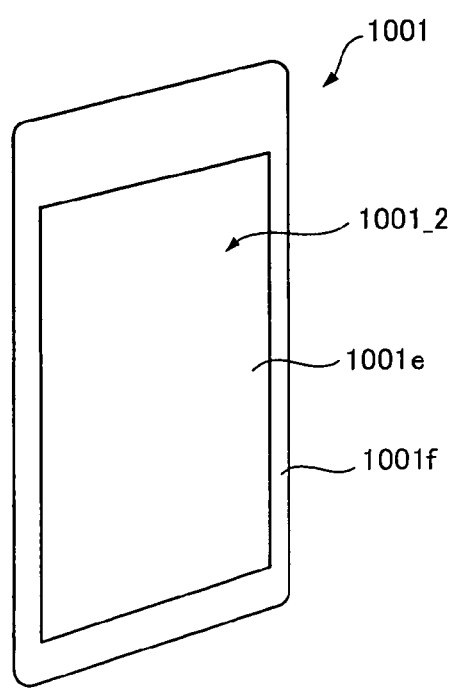
FIG. 8 is a perspective view showing a viewing surface of the instant film sheet.

FIG. 7 is a perspective view showing an exposure surface of an instant film sheet while FIG. 8 is a perspective view showing a viewing surface of the instant film sheet.

FIG. 7 shows an exposure surface 1001_1 of an instant film sheet 1001. The exposure surface 1001_1 has a developer pod 1001a which is provided at the front end in the transport direction of the instant film sheet 1001, an exposure section 1001b which is exposed to an image, a margin 1001c, and a trap 1001d which absorbs an excess of the developer. FIG. 8 shows a viewing surface 1001_2 of the instant film sheet 1001. The viewing surface 1001_2 has a viewing section 1001e used to view an image visualized as the developer is spread after a latent image is formed by exposure. It also has a margin 1001f.

Figure 9:
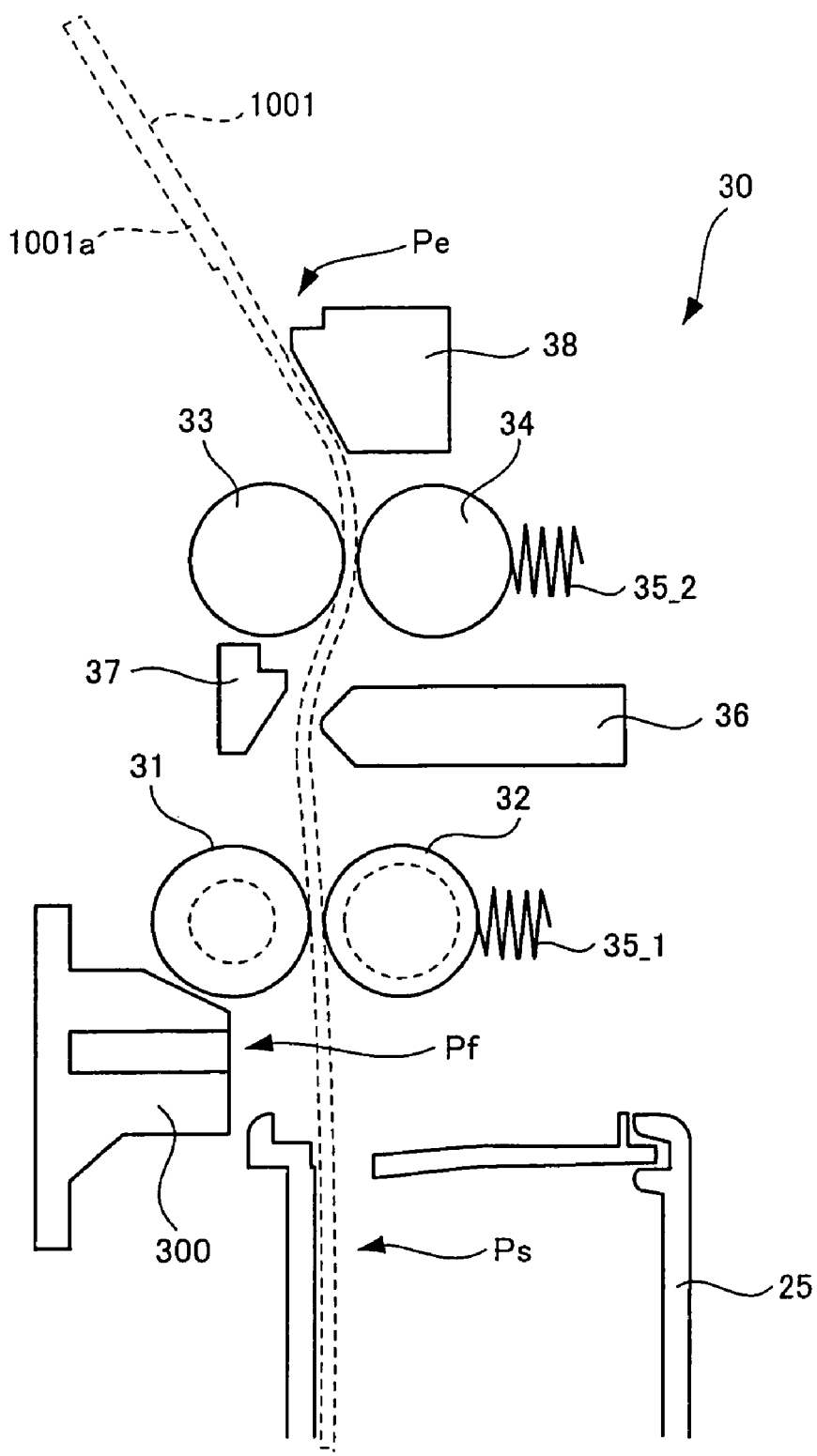
FIG. 9 is a sectional view of a media transport/developer spreading section.

FIG. 9 is a sectional view of the media transport/developer spreading section.

The media transport/developer spreading section 30 is equipped with a pair of transport rollers 31 and 32 to transport an instant film sheet 1001 by holding it from both sides. The transport roller 32 is urged toward the transport roller 31 by a spring member 35_1.

Also, downstream of the pair of transport rollers 31 and 32 in the transport direction of the instant film sheet 1001, the media transport/developer spreading section 30 is equipped with a pair of developing rollers 33 and 34 to spread a developer by holding the instant film sheet 1001 across its width and squeezing a developer pod 1001a. The developing roller 34 is urged toward the developing roller 33 by a spring member 35_2.

Furthermore, between the pair of transport rollers (31 and 32) and the pair of developing rollers (33 and 34), the media transport/developer spreading section 30 is equipped with a control plate 36 which controls the developer being spread, a film guide which guides the instant film sheet 1001 to the developing rollers 33 and 34, and a film guide frame 38 which guides the instant film sheet 1001 to the outside. Besides, the image write section 300 is installed near an exit of an instant film pack 25.

The printer 1 according to the present embodiment rakes up the uppermost one of the instant film sheets 1001 in the instant film pack 25 from a predetermined transport start point Ps using the claw 24 (see FIGS. 4 and 5) and starts to write an image onto the instant film sheet 1001 at a fixed write point Pf using the image write section 300 while the instant film sheet 1001 is being transported by the transport rollers 31 and 32. Furthermore, while writing the image onto the instant film sheet 1001, the printer 1 transports the instant film sheet 1001 using the transport rollers 31 and 32, spreads the developer by squeezing the developer pod 1001a using the developing rollers 33 and 34, develops the instant film sheet 1001 by controlling the spread developer using the control plate 36 and the film guide 37, and then transports the instant film sheet 1001 to a predetermined transport end point Pe. An image is recorded on each instant film sheet 1001 in this way.

Figure 10:
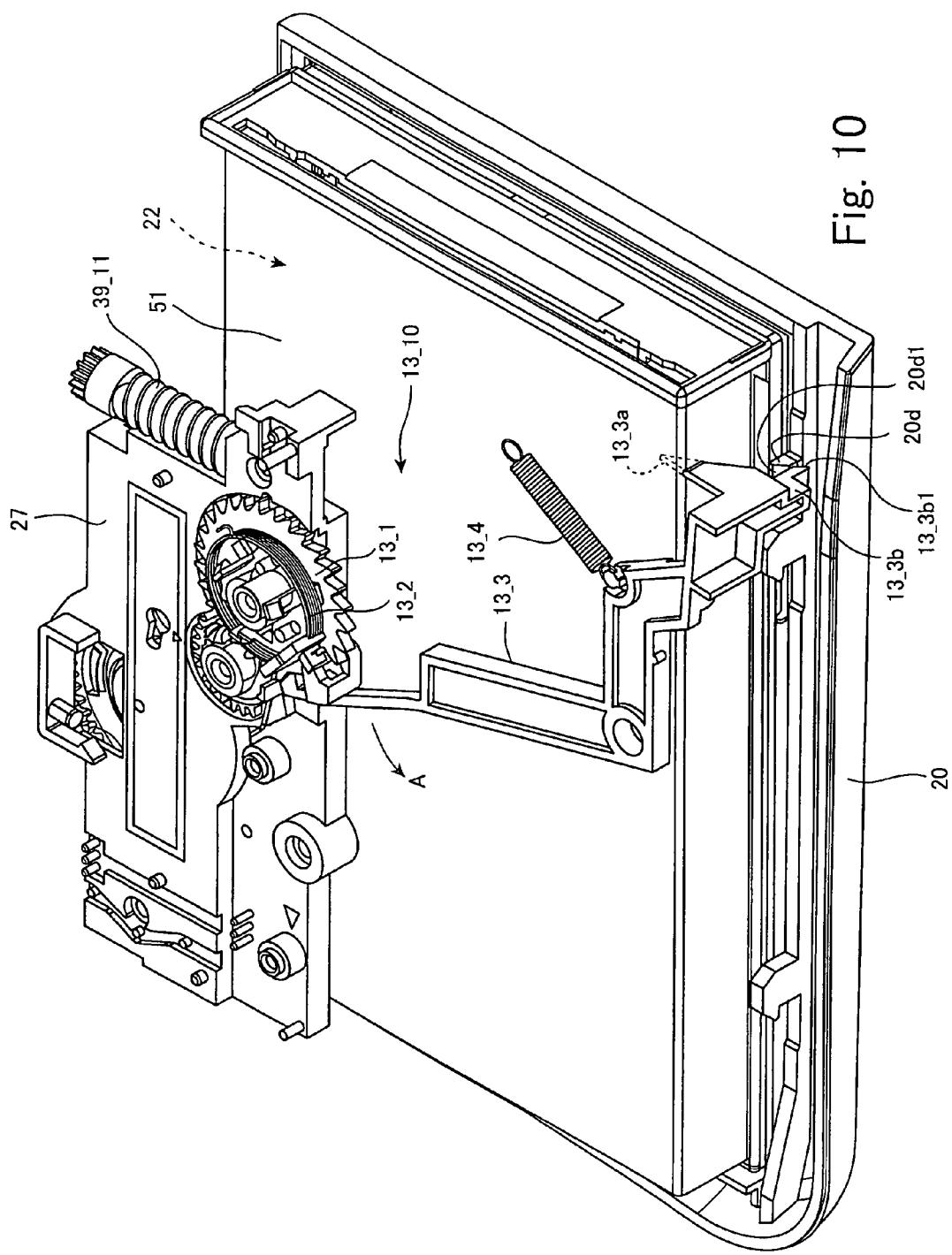
FIG. 10 is a perspective view of the printer according to the embodiment with the housing removed as viewed from the front side.
Figure 11:
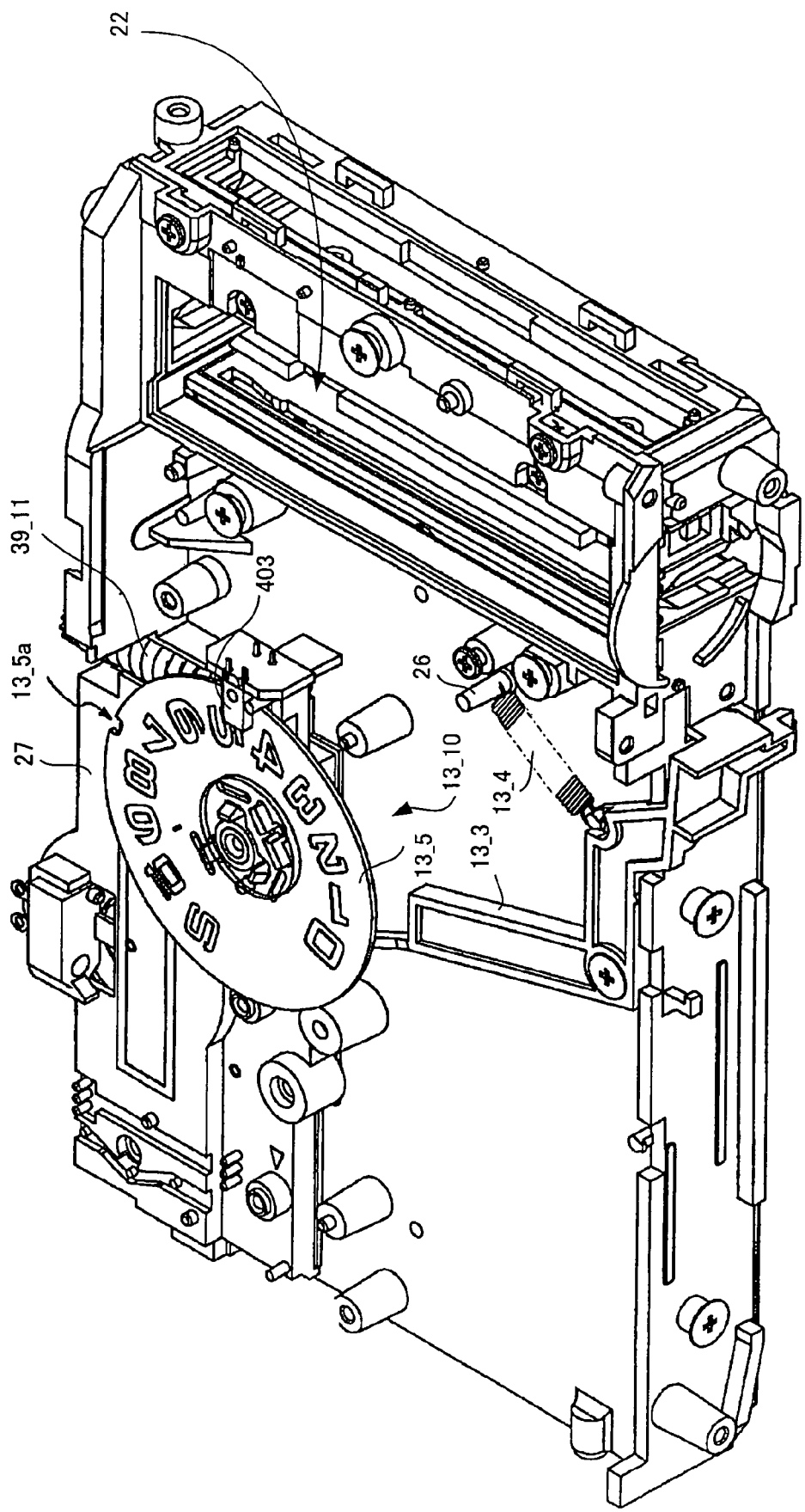
FIG. 11 is a perspective view of the printer in FIG. 10 with a character plate attached.

FIG. 10 is a perspective view of the printer according to this embodiment with the housing removed as viewed from the front side. FIG. 11 is a perspective view of the printer in FIG. 10 with a character plate attached.

As shown in FIG. 10, the printer 1 has a casing 51 which contains the pack compartment 22, and a cover member 27 as well as a counter section 13_10 constituting the counter 13 which are mounted on the casing 51. FIG. 10 also illustrates the film door 20 which openably covers the pack compartment 22. In the film door 20, a rib 20d has a slope 20d1 standing thereon.

The counter section 13_10 constituting the counter 13 is equipped with a gear 13_1 driven via a worm gear 39_11 which transmits the rotational drive force of the DC motor 406 (see FIG. 5). A character plate 13_5 shown in FIG. 11 is placed on top of the gear 13_1. The character plate 13_5 includes a character "S" and numbers "10" to "0" which are transparent. Also, a LED (not shown) is disposed under the character plate 13_5, which backlights the character plate 13_5 to make the display of the counter 13 easy to see. The character plate 13_5 shown in FIG. 11 is in a state that the numeric value "8" can be seen through the window of the counter 13 shown in FIG. 1. The character plate 13_5 also has a notch 13_5a formed between the values "7" and "8".

An unused instant film pack is provided with a light shielding plate. When an unused instant film pack is loaded, the notch 13_5a is located at the monitoring position of the COUNTPI section 403 and the character "S" indicating that an unused film pack is loaded is located at the window. In this state, when the power is turned on, the COUNTPI section 403 detects the notch 13_5a, which opens the light shielding plate by the above-described claw so that instant film sheets become ready to be used. Subsequently, the counter 13 turns the character plate 13_5 counterclockwise, and the numeric value "10" is displayed by backlighting, thereby indicating that there are ten remaining film sheets. Thereafter, every time an image is recorded on an instant film sheet, the number of remaining instant film sheets is decremented and the corresponding numeric value is displayed. When an image is recorded on the 10th instant film sheet, the numeric value "0" is displayed by backlighting, indicating there is no remaining film sheet.

Also, the counter section 13_10 is equipped with a spring member 13_2 which urges the gear 13_1 clockwise, a counter lever 13_3 whose tip is engaged with teeth of the gear 13_1, and a spring member 13_4 which urges the counter lever 13_3, with one end held by the counter lever 13_3 and the other end held by a member 26. The counter lever 13_3 is equipped with the rib 13_3a pressed by the loading of an instant film pack and a rib 13_3b having a slope 13_3b1 which is guided by the slope 20d1 of the rib 20d standing on the film door 20.

The counter 13 provided with the counter section 13_10 performs counting in synchronization with a sequence of operations for transporting instant film sheets in an instant film pack loaded in the pack compartment 22. The counter 13 is, although detailed thereof will be described later, a ratchet type counter which can be realized with an easy configuration. Because such a mechanical counter is employed, there is no need to provide a memory that is capable of storing the number of instant film sheets 1001 even if the primary batteries 407 are taken out.

In the counter 13, when the film door is opened and an instant film pack is taken out of the pack compartment 22, the counter lever 13_3 is turned by the spring member 13_4 in a direction shown by an arrow A, so that the tip of the counter lever 13_3 is disengaged from teeth of the gear 13_1. As a result, the gear 13_1 is reset to the initial state by the spring member 13_2. With such a configuration, the counter 13 is not to be reset even if the film door is unintentionally opened and closed when such unintentional opening is noticed. Therefore, it is possible to solve a problem that the actual number of remaining film sheets available for image-taking is different from the number of remaining film sheets displayed on the counter 13.

Either when the film door 20 is closed or when an instant film pack is taken out of the pack compartment 22, the printer 1 of this embodiment is set to a state that it is ready to perform counting in synchronization with a sequence of transportation operations. Therefore, for example, when the film door 20 is closed while no instant film pack is loaded in the pack compartment 22, the printer 1 is set to a state in which it is ready to carry out counting in synchronization with transport operations performed thereafter. Specifically, the slope 20d1 of the rib 20d standing on the film door 20 is guided by the slope 13_3b1 of the rib 13_3b disposed on the counter lever 13_3, so that the tip of the counter lever 13_3 engages teeth of the gear 13_1. In this state, the printer 1 can check the motions by performing the sequence of operations using infrared communication.

Figure 12:
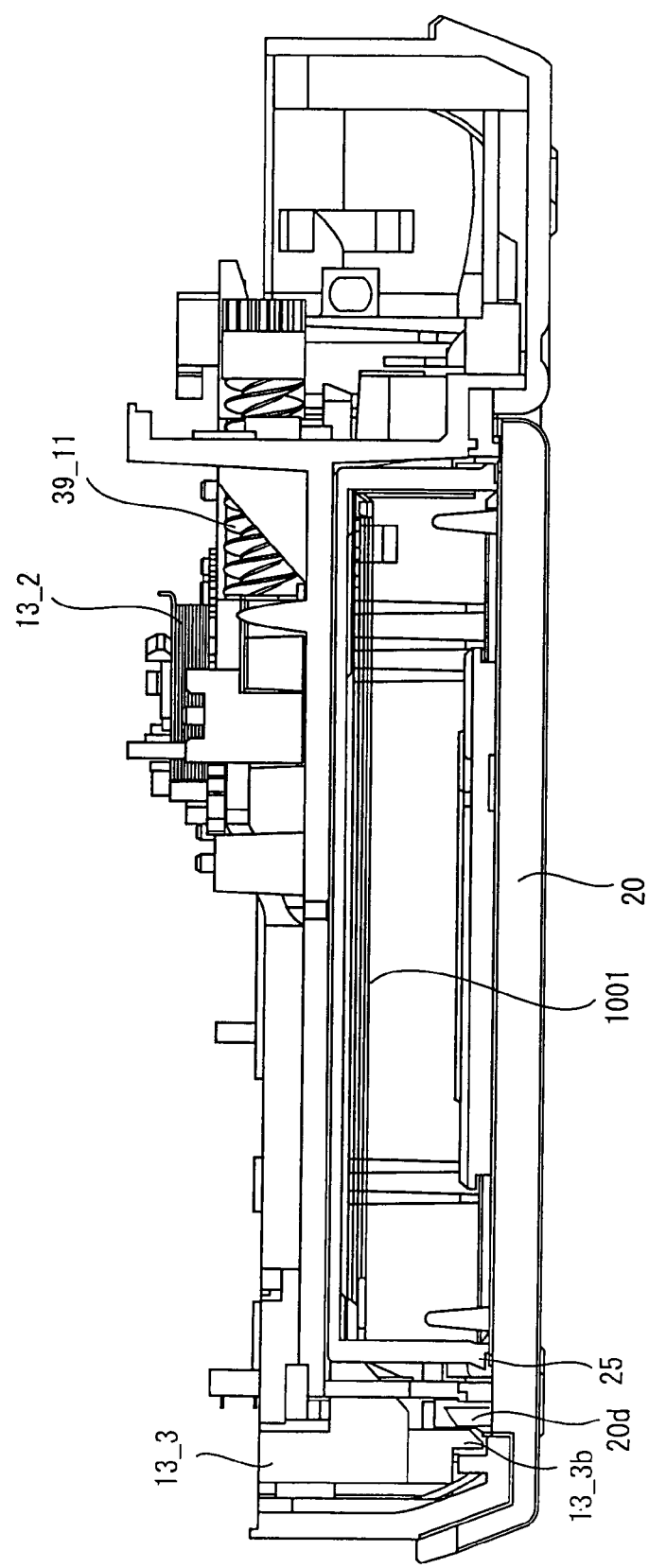
FIG. 12 is a sectional view of the printer shown in FIG. 10 with its film door closed.

FIG. 12 is a sectional view of the printer shown in FIG. 10 when an instant film pack is loaded therein and the film door is closed.

FIG. 12 shows the rib 20d disposed on the film door 20, the counter lever 13_3, and the rib 13_3b disposed on the counter lever 13_3. FIG. 12 also shows the instant film pack 25 containing the stacked instant film sheets 1001. In this figure, the printer 1 is in a state in which the instant film pack 25 is loaded therein and the film door 20 is closed. In this state, the rib 13_3b of the counter lever 13_3 is pressed by the rib 20d of the film door 20 and thus, the tip of the counter lever 13_3 is engaged with teeth of the gear 13_1 as shown in FIG. 13 which will be described below.

Figure 13:
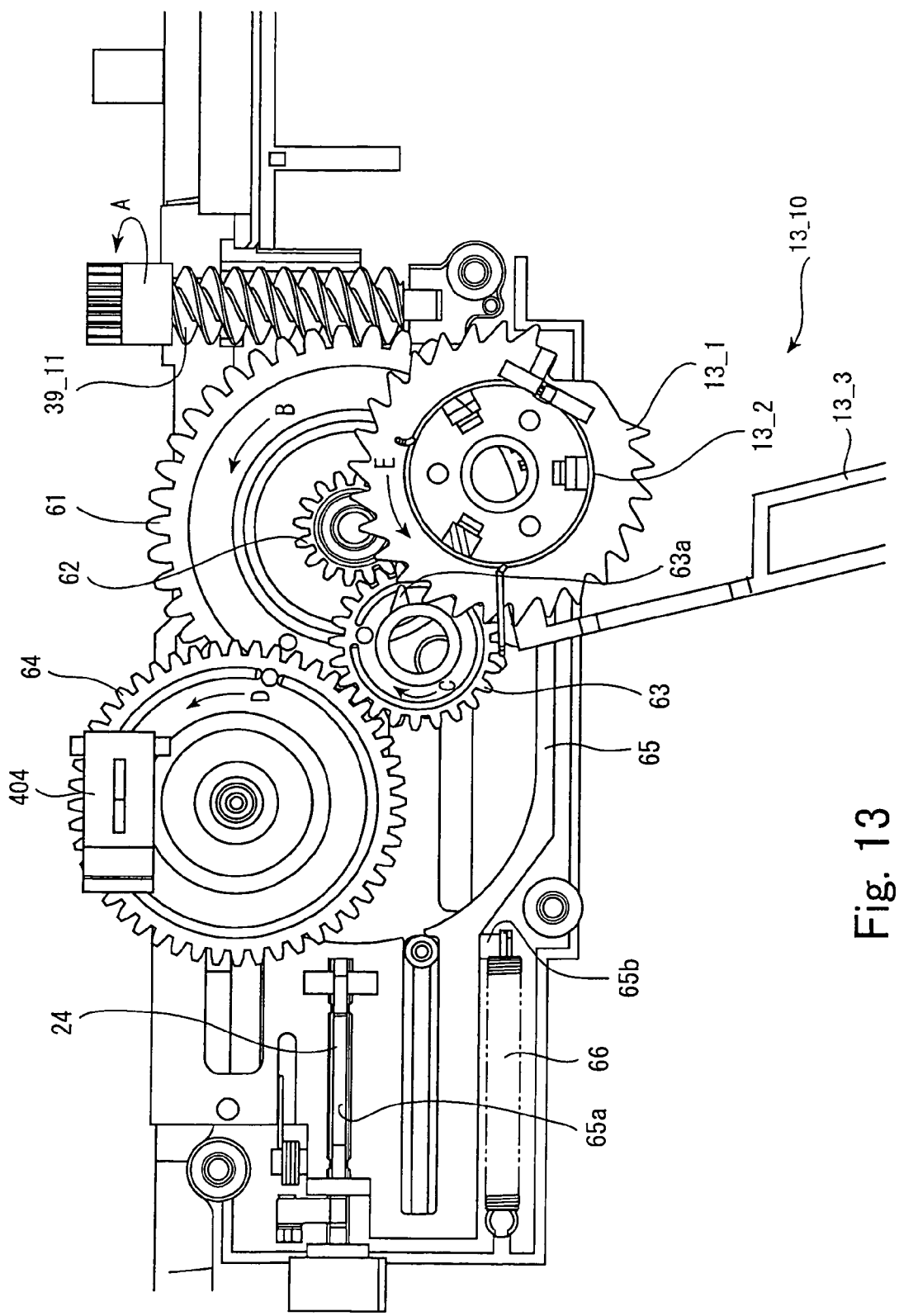
FIG. 13 is a plan view of the printer shown in FIG. 10 with its cover member removed.

FIG. 13 is a plan view of the printer shown in FIG. 10 with its cover member removed.

FIG. 13 shows the worm gear 39_11 which rotates in the direction of an arrow A, a three-rotation cam 61 which rotates in the direction of an arrow B under the rotational drive force of the worm gear 39_11, a gear 62 which rotates along with the three-rotation cam 61, a gear 63 which rotates in the direction of an arrow C in mesh with the gear 62, and a single-rotation cam 64 which rotates in the direction of an arrow D under the rotational drive force of the gear 63. The single-rotation cam 64 completes a sequence of transport operations by one rotation. The three-rotation cam 61 rotates three times while the single-rotation cam 64 makes a single rotation. Also, on the top of the single-rotation cam 64, there is disposed a cam switch 404 used to monitor the initial position of the sequence.

FIG. 13 also shows a claw plate 65 and a spring member 66 which urges the claw plate 65. A straight guide groove 65a is provided in the claw plate 65 to guide the claw 24. A holding member 65b is installed on the claw plate 65 to hold the spring member 66.

As mentioned above and shown in FIG. 12, when the instant film pack 25 is loaded and the film door 20 is closed, the tip of the counter lever 13_3 is engaged with teeth of the gear 13_1. In this state, when the worm gear 39_11 rotates in the direction of the arrow A, the three-rotation cam 61 rotates in the direction of the arrow B, causing the claw plate 65 to start rising towards the worm gear 39_11. When the claw plate 65 starts rising, the claw 24 starts rising as well. Consequently, the instant film sheet 1001 starts to be raked up. Also, the gear 62 rotates along with the three-rotation cam 61, transmitting the rotational drive force of the gear 62 to the gear 63. Accordingly, the gear 63 rotates in the direction of the arrow C. The gear 63 is provided with a pawl 63a which presses down the lower part of each tooth of the gear 13_1 provided in the counter 13. When the pawl 63a does so, the gear 13_1 rotates in the direction of the arrow E and the tip of the counter lever 13_3 being engaged with the teeth of the gear 13_1 slides over these teeth to engage with the next teeth. This motion is repeated twice in the sequence of the transport operations. That is, the gear 13_1 of the counter 13 rotates in the direction of the arrow E by two teeth in the sequence of the transport operations, thereby causing the character plate 13_5 to rotate in the direction for decrementing by one value. In this way, the counter 13 is decremented by one value every time an instant film sheet 1001 is discharged.

The counter 13 is disposed on the same side as a plane of the printer 1, which faces the exposure surface of an instant film sheet contained in the instant film pack 25 loaded in the pack compartment 22. Since the area of the plane facing the exposure surface of an instant film sheet is large, large-sized numerals can be used to indicate the number of remaining instant film sheets 1001. Accordingly, easy-to-see display is realized by such an arrangement in addition to the backlighting of the character plate 13_5.

Now, the structure and function of the pack compartment will be described.

Figure 14:
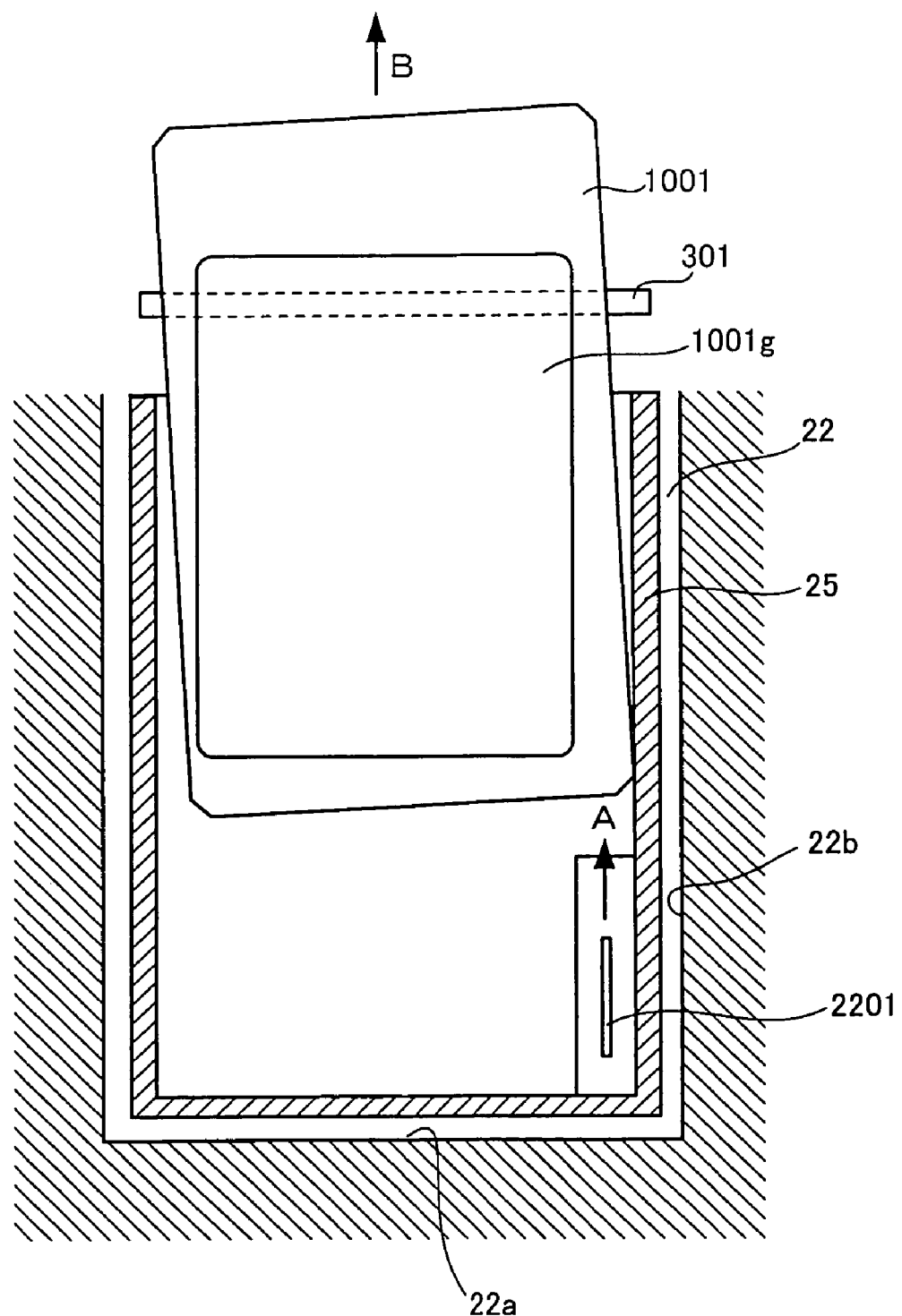
FIG. 14 is a diagram explaining a problem in the pack compartment for which no measure is taken.

FIG. 14 is a diagram explaining a problem in the pack compartment for which no measure is taken.

When an instant film pack 25 is loaded into the pack compartment 22, instant film sheets 1001 are pushed out from the instant film pack 25 in a direction shown by an arrow A and then transported by transport rollers in a direction shown by an arrow B. To push out the instant film sheets 1001, the claw 24 projects through the claw motion slit 2201 formed in the pack compartment 22 (see FIG. 4) and enters the instant film pack 25. The claw 24 then engages the rear end of one of the instant film sheets 1001 contained in the instant film pack 25 and pushes it in the direction of the arrow A. The inside of the instant film pack 25 is designed to be slightly larger in size than the instant film sheets 1001. The claw motion slit 2201 formed in the pack compartment 22 and the claw 24 which projects through the claw motion slit 2201 into the pack compartment 22 are formed in a position closer to a rear wall 22a delimiting the rear ends of the instant film sheets 1001 in the transport direction (direction of the arrow B) and closer to a sidewall 22b of the pack compartment 22. Therefore, when an instant film sheet 1001 is pushed up by the claw 24 which has entered the pack compartment 22 as well as the instant film pack 25 through the claw motion slit 2201, as shown in FIG. 14, it is transported in the direction of the arrow B while remaining in a tilted posture with respect to the optical head section 301 provided in the image write section 300 (see FIG. 4). Then, a latent image to be recorded by irradiation with RGB colors carried out by the optical head section 301 is tilted with respect to the instant film sheet 1001 and thus a tilted image 1001g is recorded on the instant film sheet 1001.

Figure 15:
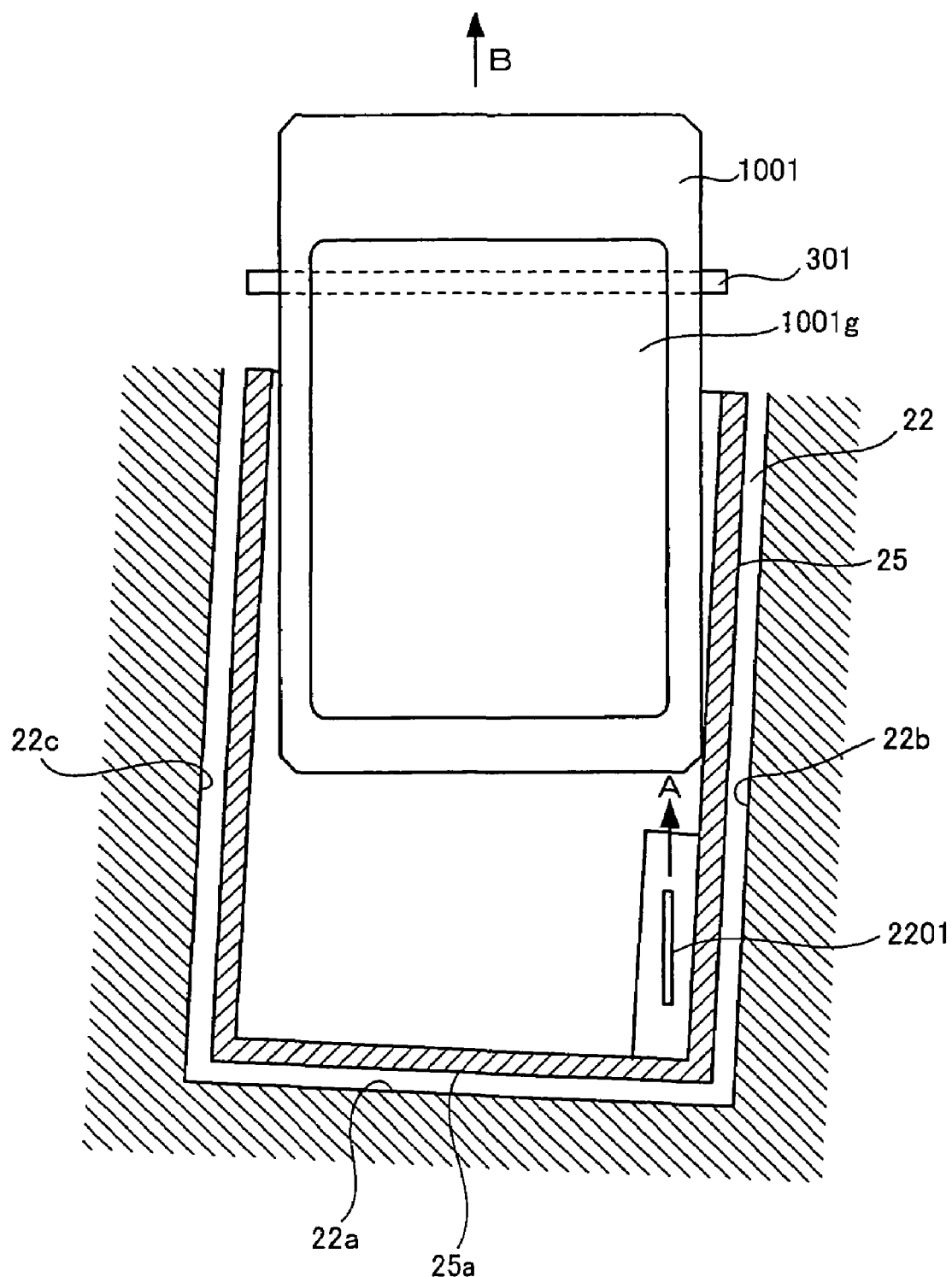
FIG. 15 is a diagram explaining how the problem described with reference to FIG. 14 is solved.

FIG. 15 is a diagram explaining how the problem described with reference to FIG. 14 is solved.

In this figure, an instant film pack 25 is supported in a tilted posture. Specifically, a part of a rear-end face 25a of the instant film pack 25 is raised, the part is closer to a sidewall 22c facing the sidewall 22b near which the claw motion slit 2201 is provided. More specifically, the instant film pack 25 is loaded in the pack compartment 25 in a state that it is tilted in a direction opposite to the direction in which the instant film sheet 1001 pushed out by the claw 24 from the pack compartment 25 is tilted. Therefore, the instant film sheet 1001 pushed out from the pack compartment 25 by the claw 24 is transported while being kept at a proper angle with respect to the optical head section 301 and thus an proper-angle image 1001g is formed without being tilted.

Figure 16:
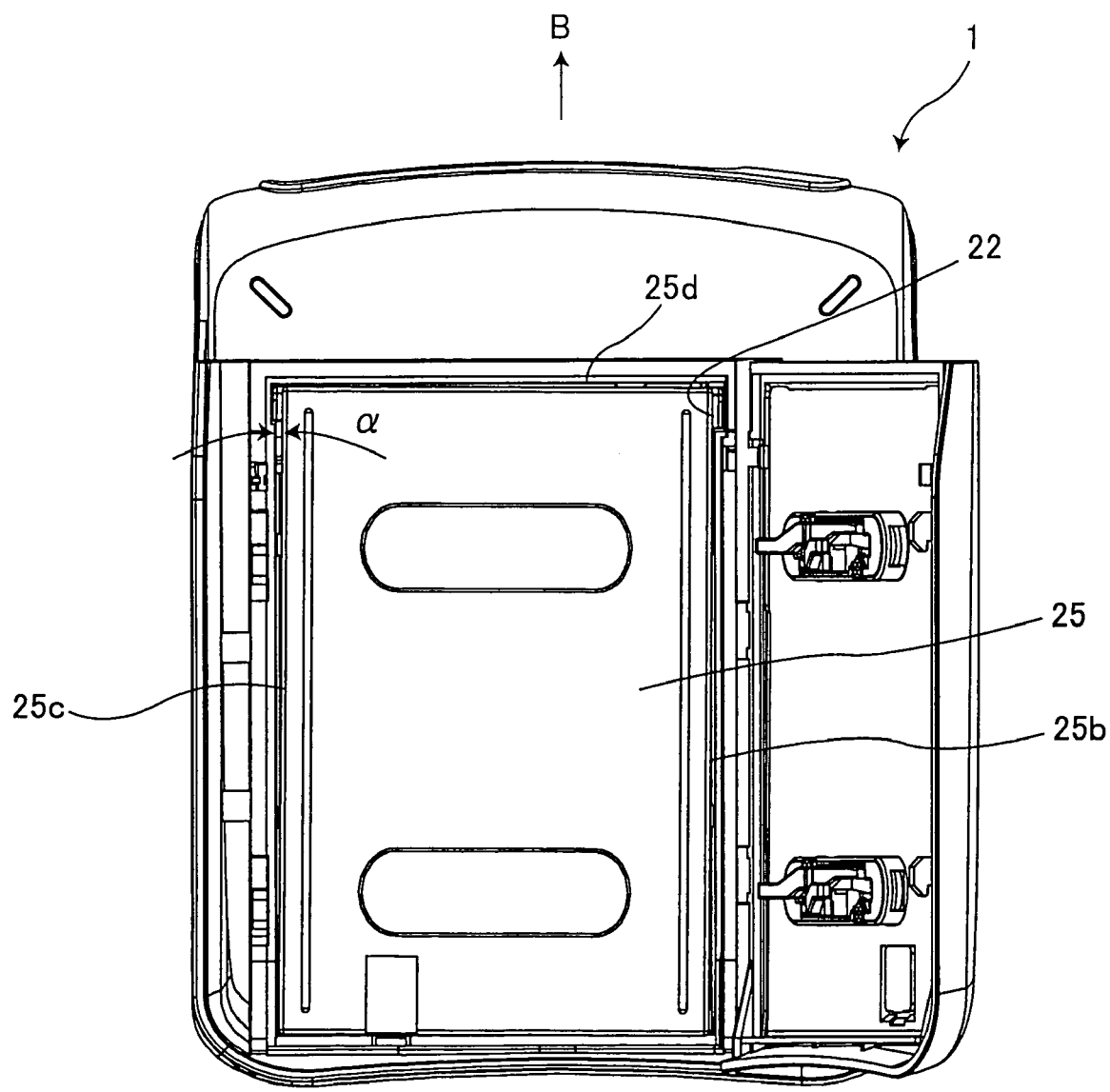
FIG. 16 a plan view of the printer viewed from the pack compartment side when the instant film pack is loaded into the pack compartment.

FIG. 16 a plan view of the printer 1 in the present embodiment viewed from the pack compartment 22 side when the instant film pack 25 is loaded into the pack compartment 22.

The instant film pack 25 in the pack compartment 22 is supported in such a state that it is tilted towards the right in FIG. 16 by an angle a with respect to the transport direction (direction of an arrow B).

Figure 17:
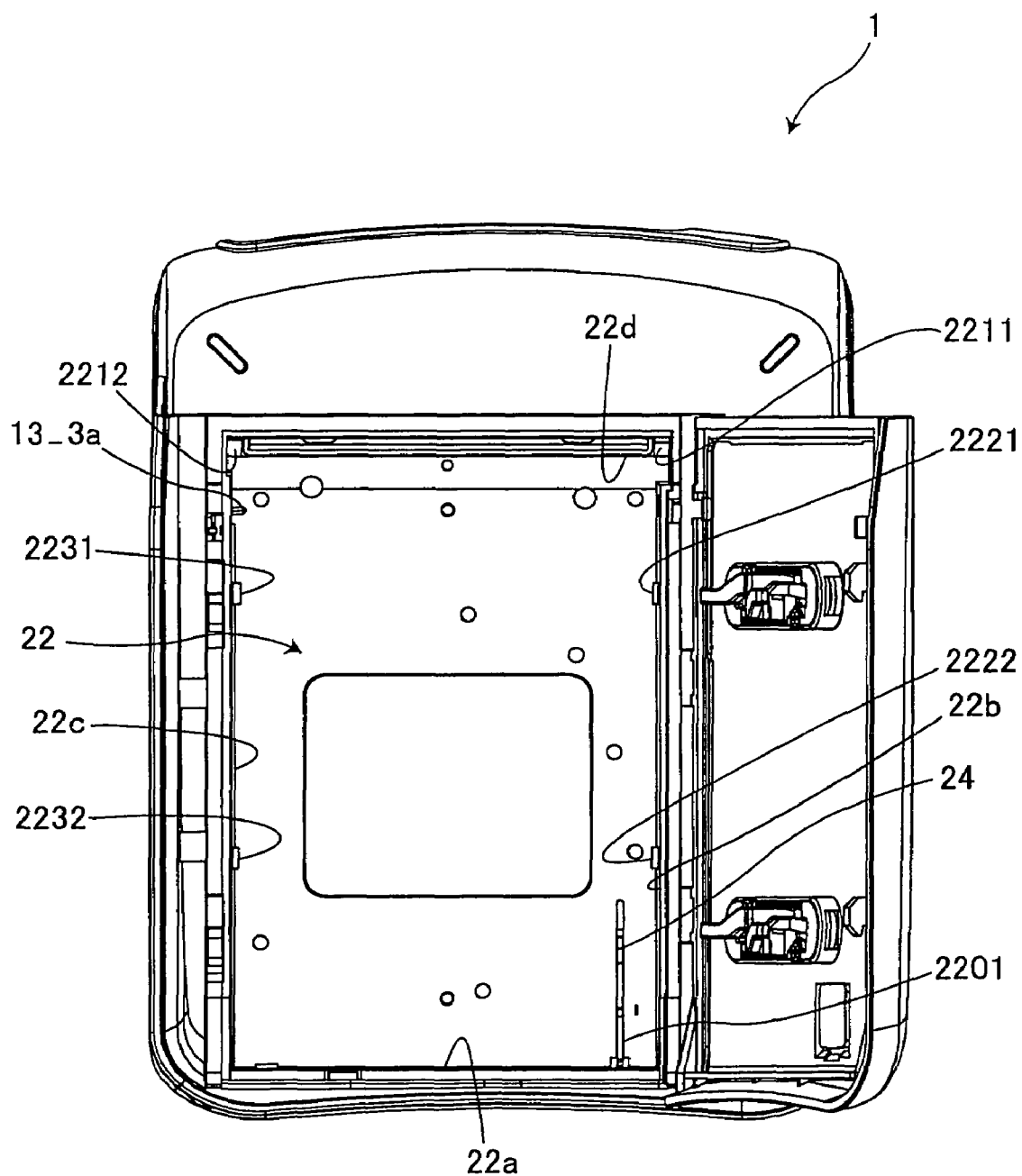
FIG. 17 is a plan view of the printer viewed from the pack compartment side, which shows the shape of the pack compartment.
Figure 18:
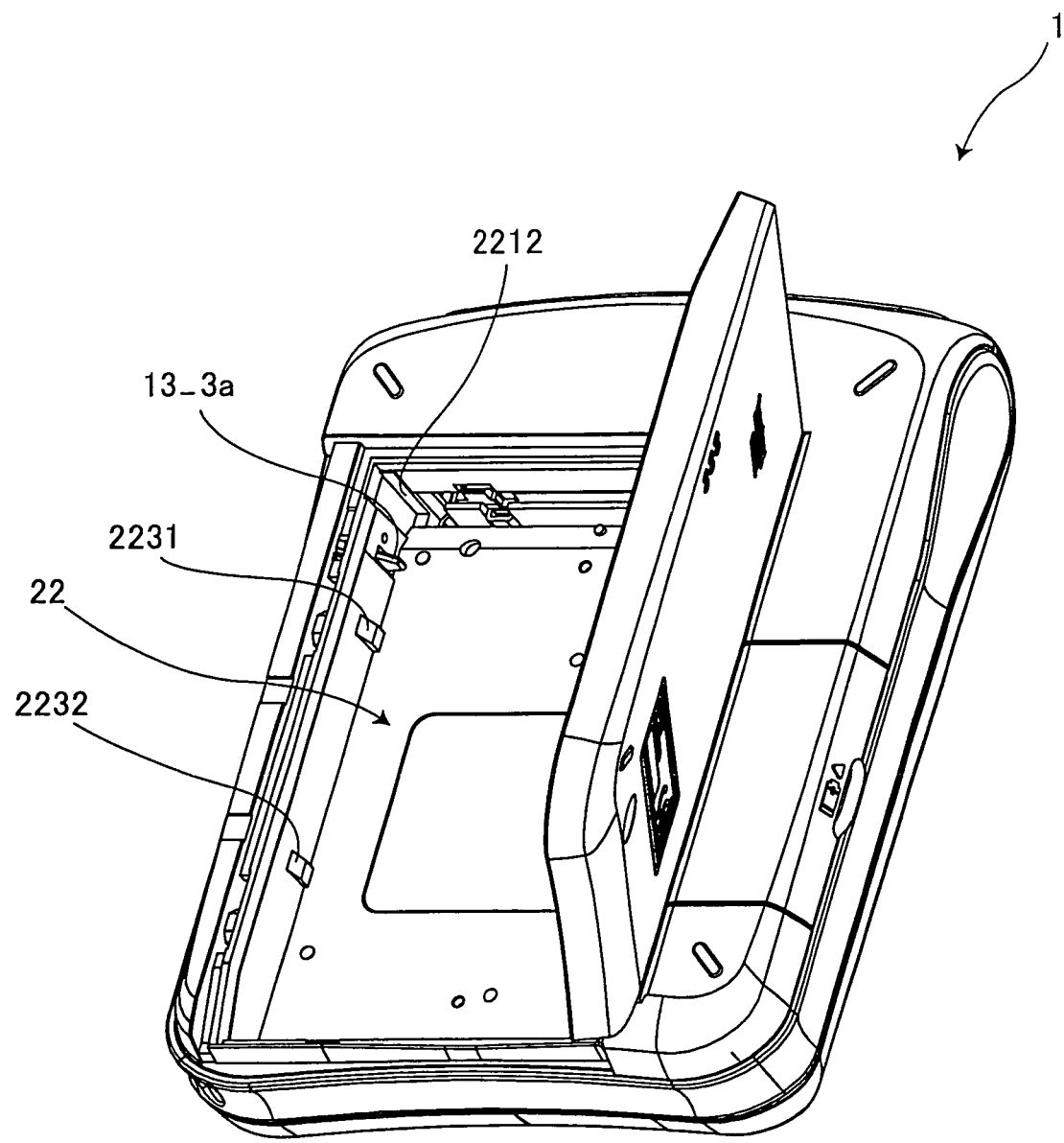
FIG. 18 is a perspective view of the printer viewed from the pack compartment side, which shows the shape of the pack compartment.
Figure 19:
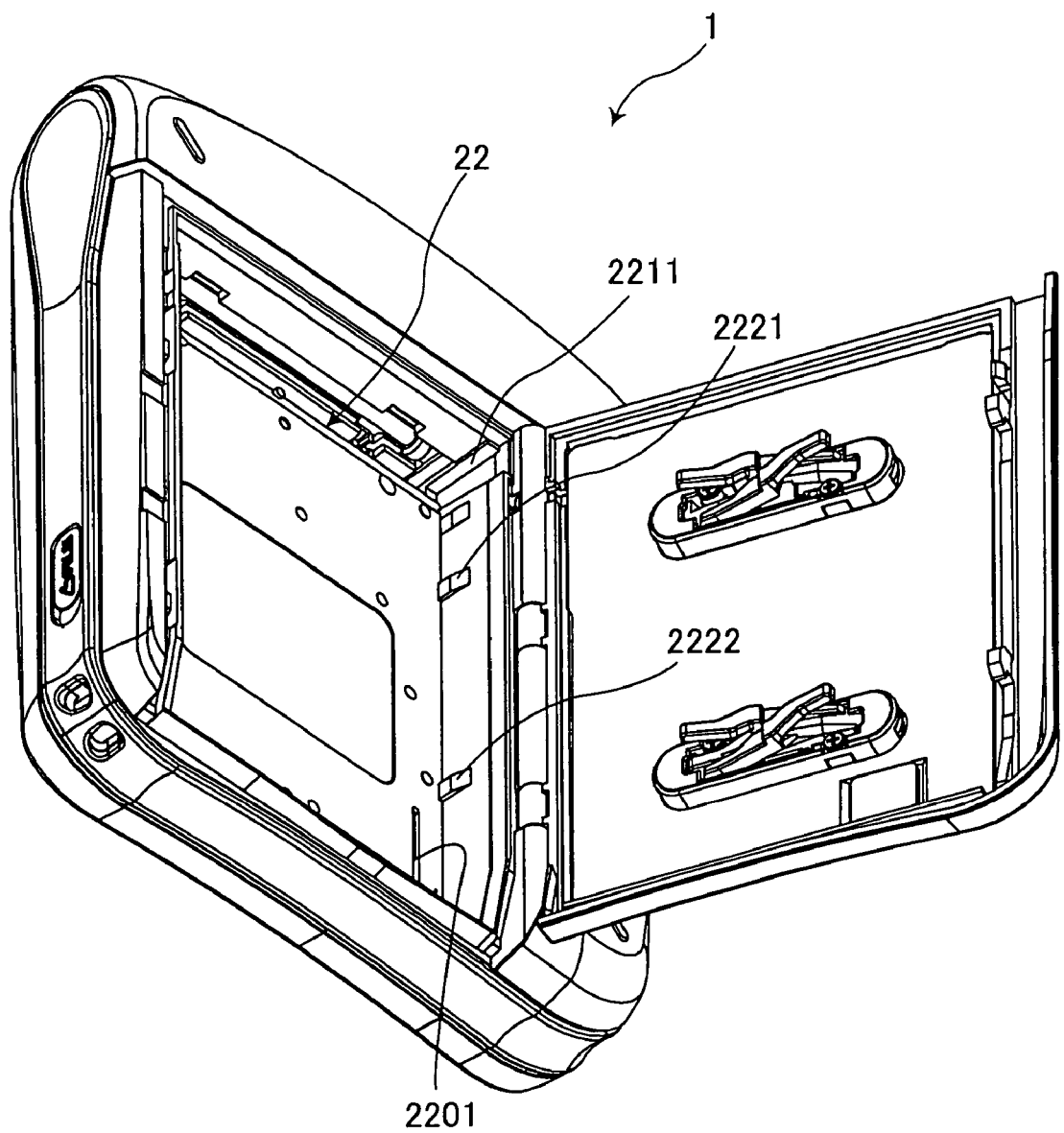
FIG. 19 is a perspective view of the printer viewed from another angle side, which shows the shape of the pack compartment.

FIGS. 17 through 19 are a plan view, a perspective view, and a perspective view from another angle of the printer 1 of the present embodiment, which show the shape of the pack compartment viewed from the pack compartment side, respectively.

In the pack compartment 22, the receiving surfaces 2211 and 2212 composing a pair are respectively formed on both ends of a wall of the pack compartment 22 excluding a sheet outlet 22d, which delimits the front edges of the film sheets in the transport direction (direction of an arrow B). The receiving surfaces 2211 and 2212 project into the pack compartment 22 and support a front-end face 25d (see FIG. 16) of the instant film pack 25. The receiving surface 2211 is formed closer to the one sidewall 22b of the pack compartment 22. Near the sidewall 22b, there is formed the claw motion slit 2201 through which the claw 24 projects into the pack compartment 22 to move. The receiving surface 2211 projects further than the receiving surface 2212 formed closer to the other sidewall 22c. When the claw 24 projecting through the claw motion slit 2201 pushes out an instant film sheet in the instant film pack 25 loaded in the pack compartment 22, the force by the claw 24 in the transport direction (direction of the arrow B in FIG. 16) is also exerted on the instant film pack 25 and the front-end face of the instant film pack 25 is held by the pair of receiving surfaces 2211 and 2212. Accordingly, the instant film pack 25 in the pack compartment 22 can be supported in such a position that it is inclined by the angle a as shown in FIG. 16 by making the receiving surfaces 2211 and 2212 to have the respective amounts of projection mutually different.

The pack compartment 22 also has: the receiving surfaces 2221 and 2222 which project from the sidewall 22b of the pack compartment 22 into the pack compartment 22 and support a right side face 25b (see FIG. 16) of the instant film pack 25 loaded into the pack compartment 22; and the receiving surfaces 2231 and 2232 which project from the sidewall 22c of the pack compartment 22 into the pack compartment 22 and support a left side face 25c (see FIG. 16) of the instant film pack 25 loaded into the pack compartment 22.

Of the receiving surfaces 2221 and 2222 which project from the sidewall 22b of the pack compartment 22 into the pack compartment 22, the one receiving surface 2222 formed closer to the claw motion slit 2201 projects further than the other receiving surface 2221. Also, of the receiving surfaces 2231 and 2232 which project from the sidewall 22c of the pack compartment 22 into the pack compartment 22, the one receiving surface 2231 formed closer to the rib 13_3a of the counter lever projects further than the other receiving surface 2232. The instant film pack 25 loaded in the pack compartment 22 is urged by the rib 13_3a of the counter lever to form the angle a shown in FIG. 16.

Therefore, the instant film pack 25 loaded in the pack compartment 22 is also supported by the receiving surfaces 2221, 2222, 2231, and 2232 for supporting the right and left side faces of the instant film pack 25 in a position that it is inclined by the angle a shown in FIG. 16.

As described above, according to the printer 1 of the present embodiment, the receiving surfaces 2211, 2212, 2221, 2222, 2231, and 2232 are made different in the amount of projection to support an instant film pack while keeping it tilted in the pack compartment 22. Accordingly, an instant film sheet that is discharged from such a tilted instant film pack is transported while being set to a proper angle with respect to the transport direction so that a proper-angle image is recorded.

What is claimed is:

1. An image recording apparatus which has a pack compartment to be loaded with an instant film pack containing multiple instant film sheets stacked together and records images on the instant film sheets contained in the instant film pack loaded into the pack compartment while transporting the instant film sheets, each of the instant film sheets having: an image recording section for recording an image by exposure and spread of a developer; and a developer pod disposed closer to the front of a transport direction than the image recording section, the image recording apparatus comprising:

a push-out member which is disposed in a position closer to the rear wall and one sidewall of the pack compartment and projects into the pack compartment, the rear wall delimiting the rear ends of the instant film sheets in the transport direction, and which pushes out one of the instant film sheets in the instant film pack loaded in the pack compartment from the instant film pack by engaging the rear end of the one of the instant film sheets, wherein the pack compartment has a supporting section which supports the instant film pack loaded in the pack compartment while keeping the instant film pack tilted by raising a part, which is closer to the other sidewall facing the one sidewall, of the rear-end face of the instant film pack.

2. The image recording apparatus according to claim 1, wherein the supporting section has a pair of receiving surfaces at each of right and left ends of a wall of the pack compartment excluding a sheet outlet formed in the front of the transport direction, the pair of receiving surfaces projecting into the pack compartment and supporting the front-end face of the instant film pack loaded in the pack compartment, and wherein one receiving surface of the pair of the receiving surfaces, that is disposed closer to the one sidewall near which the push-out member is disposed, projects further than the other receiving surface disposed closer to the other sidewall.

3. The image recording apparatus according to claim 1, wherein the supporting section has a plurality of receiving surfaces which project from both sidewalls of the pack compartment running along the transport direction and support both side faces of the instant film pack loaded in the pack compartment, and wherein the plurality of receiving surfaces support the instant film pack while keeping the instant film pack tilted by making the respective amounts of projection thereof mutually different.

4. The image recording apparatus according to claim 2, wherein the supporting section has a plurality of receiving surfaces which project from both sidewalls of the pack compartment running along the transport direction and support both side faces of the instant film pack loaded in the pack compartment, and wherein the plurality of receiving surfaces support the instant film pack while keeping the instant film pack tilted by making the respective amounts of projection thereof mutually different.

* * * * *